Figure 2:
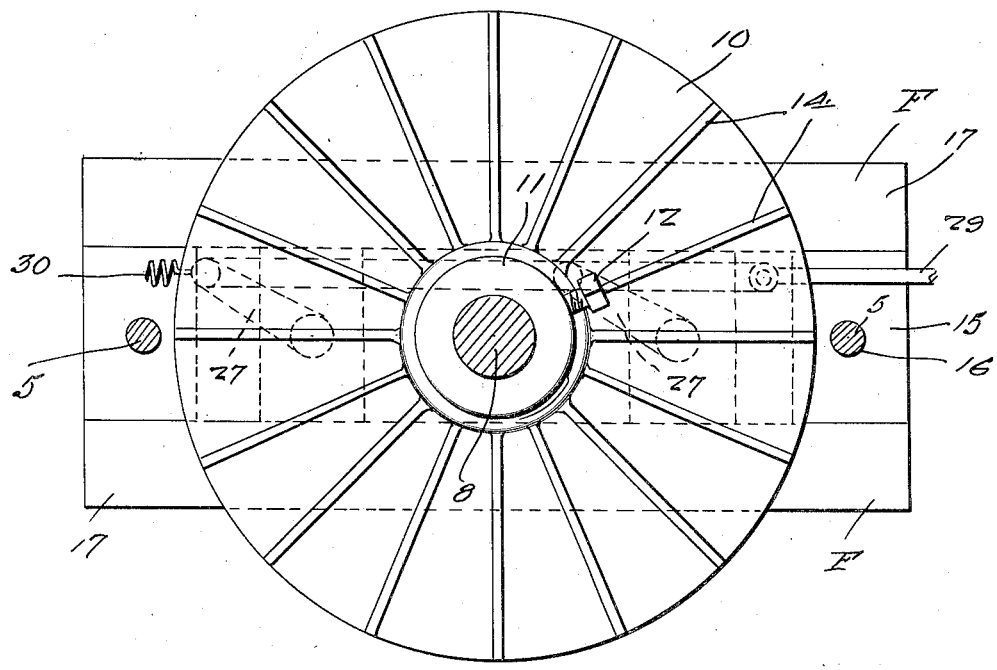

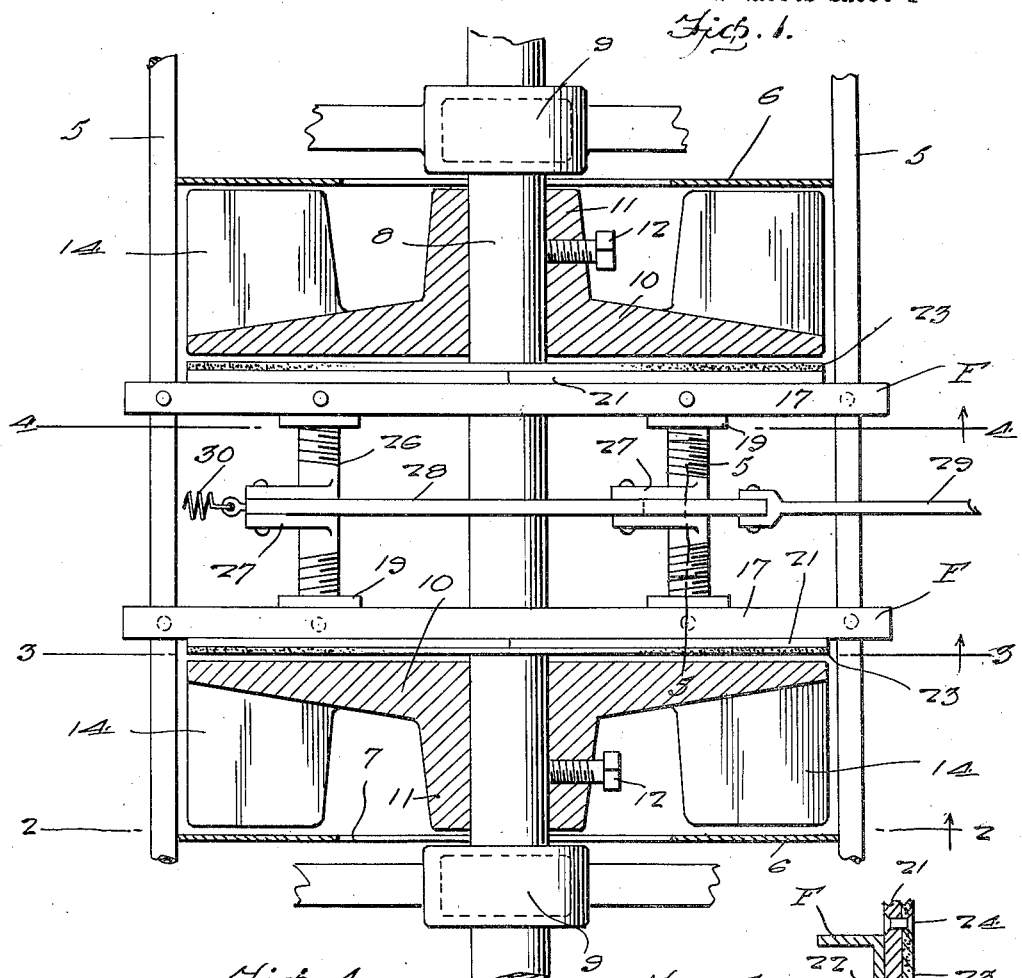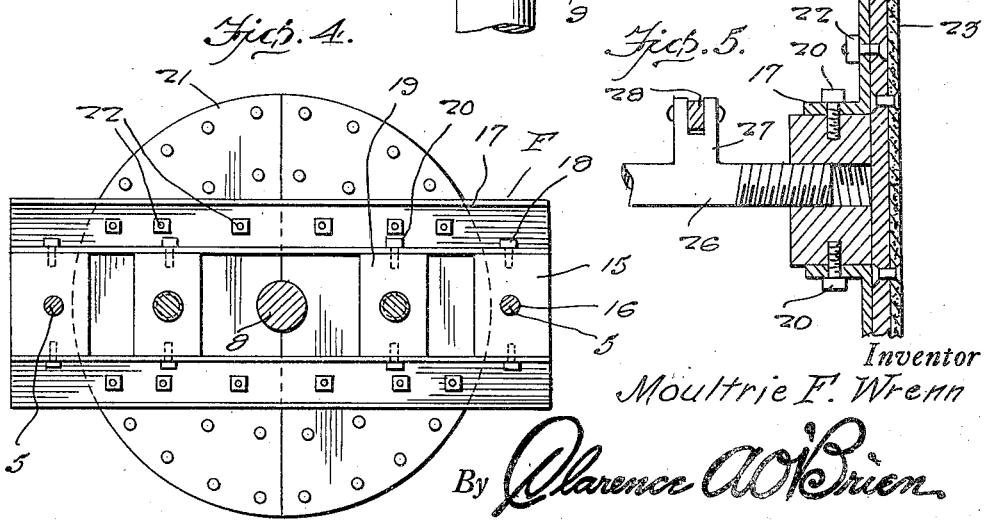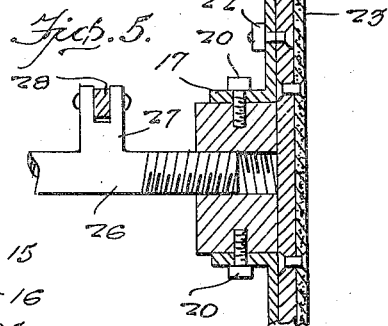

Jan. 18, 1927.

M. F. WRENN 1,614,976

BRAKE

Filed August 10, 1926    2 Sheets-Sheet 2

Inventor
Moultrie F. Wrenn

By Clarence A. O'Brien
Attorney

Patented Jan. 18, 1927.

1,614,976

UNITED STATES PATENT OFFICE.

MOULTRIE F. WRENN, OF PORTLAND, OREGON, ASSIGNOR OF ONE-HALF TO SAMUEL A. WRENN, OF PORTLAND, OREGON.

BRAKE.

Application filed August 10, 1926. Serial No. 128,478.

The present invention relates to a brake such as may be used on automobiles under any circumstances for braking the rotation of a shaft or the like.

The principal object of the invention is to provide a braking mechanism that is exceedingly simple in its construction, inexpensive to manufacture, very strong and durable, exceedingly efficient and reliable in operation, not likely to easily become out of order, compact and convenient, and otherwise well adapted to the purpose for which it is designed.

Another particular object of the invention is to provide means in a brake mechanism for affording a circulation of air to cool the contact surfaces of the braking mechanism.

With the above and numerous other objects in view as will appear as the description proceeds, the invention resides in certain novel features of construction and in the combination and arrangement of parts as will be hereinafter more fully described and claimed.

In the drawing:—

Figure 3:
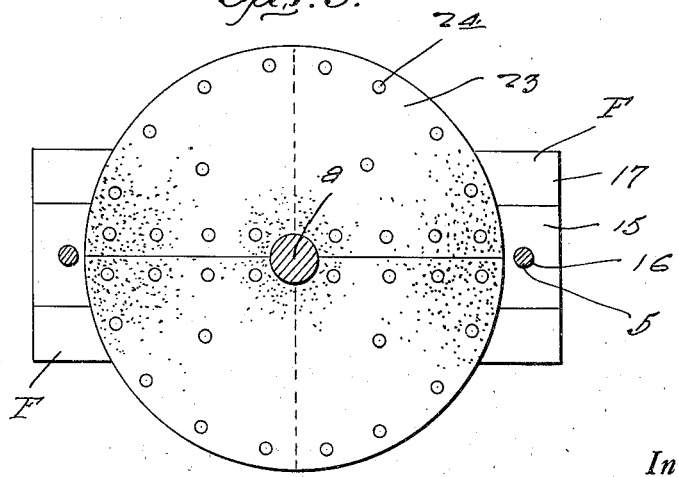

Figure 1 is a sectional view through the braking mechanism embodying the features of my invention, Fig. 2 is a section taken substantially on the line 2—2 of Fig. 1, Fig. 3 is a section taken substantially on the line 3—3 of Fig. 1, Fig. 4 is a section taken substantially on the line 4—4 of Fig. 1, and Fig. 5 is a detail section taken substantially on the line 5—5 of Fig. 1.

Referring to the drawing in detail, it will be seen that the numbers 5 denote frame members. Plates 6 are disposed between the frame members 5 in spaced parallel relation and have openings 7 therein. A shaft 8 extends through the openings 7 and may be mounted, for example, in suitable bearings 9. A pair of disks 10 are provided with central hub portions 11 which receive the shaft 8 and these hub portions are fixed to the shaft by means of set screws 12 piercing openings in the hubs. The outer surfaces of the disks 10 are provided with an annular series of fins 14 for agitating the air in the space between the plates 6 and setting up a circulation for cooling purposes.

Frames indicated generally by the letters F are mounted to slide on the members 5. Each frame F includes a pair of blocks 15 having openings 16 pierced by the frame rods 5. A pair of channel irons 17 are fixed to the blocks 15 as at 18. A pair of blocks 19 are fixed to the channel irons 17 as at 20. A disk 21 is fixed as at 22 to the channel irons 17 of the frame. Each disk 21 is formed in two half sections, and the shaft 8 pierces a central opening therein. Disks 23 are fixed to the disks 21 as at 24 and are constructed of some suitable brake lining material. These brake lining material disks 23 are formed each into two half sections and the split line of the disk 23 is at right angles to the split line of the disk 21.

A pair of shafts 26 are provided with oppositely threaded ends which are engaged in the blocks 19 so that the rocking of these shafts will move the frames F either toward or away from each other. Cranks 27 are provided on the shafts 26 and are engaged with a link 28 which is in turn engaged with an operating member 29 leading to some convenient point of manipulation, such as to a foot pedal or the like. A suitable spring 30 is engaged with the other end of the link 28, to normally hold the brake mechanism in a released position as shown in Fig. 1.

Therefore, to apply the brake, the rod 29 is pulled to the right of the Fig. 1, thereby actuating the link 28 and swinging the cranks 27 to rock the shaft 26 thereby moving the frames F away from each other and moving the brake lining disks 23 into frictional engagement with the inner faces of the disks 10 which are fixed to the shaft 8, thereby causing a braking action on the shafts. When the brakes are released and the shaft is in rotation, the blades 14 circulate the air which will tend to cool the engaging surfaces of the disks 23 and the disks 10.

It is thought that the construction, operation, and advantages of this invention will be clearly apparent to those skilled in this art without a more detailed description thereof. The present embodiment of the invention has been disclosed in detail, merely by way of example since in actual practice, it attains the features of advantage enumerated as desirable in the statement of the invention and the above description. The present embodiment is obviously subjectable to numerous changes in the details of construction, and in the combination and arrangement of parts without departing from the spirit or scope of the invention as hereinafter claimed or sacrificing any of its advantages.

Having thus described my invention, what I claim as new is:—

1. A braking mechanism of the class described including, in combination, a pair of spaced parallel members, a pair of frames slidable on the members, friction means carried by the frames, a shaft, disks mounted on the shaft for rotation therewith, means for moving the frames toward and away from each other for engaging the friction means with the disks and disengaging said friction means from said disks, fins on said disks for setting up a circulation of air for cooling purposes, each frame including a pair of blocks slidable on the members, a pair of angle irons on the blocks, and a pair of blocks between the angle irons for engaging the operating mechanism.

2. A braking mechanism of the class described, including in combination, a pair of spaced parallel members, a pair of frames slidable on the members, friction means carried by the frames, a shaft, disks mounted on the shaft for rotation therewith, means for moving the frames toward and away from each other for engaging the friction means with the disks and disengaging said friction means from said disks, fins on said disks for setting up a circulation of air for cooling purposes, each frame including a pair of blocks slidable on the members, a pair of angle irons on the blocks, a pair of blocks between the angle irons for engaging the operating mechanism, and a rigid disk carried by each frame for receiving the friction means.

3. A braking mechanism of the class described including, in combination, a pair of spaced parallel members, a pair of plates having openings disposed in spaced parallelism between the members, a shaft rotatable through the openings, a pair of disks on the shaft, means for adjustably engaging the disks with the shaft, a pair of frames, each frame including a pair of blocks, one slidable on each member, a pair of channel irons fixed to the blocks, a second pair of blocks having threaded openings, a rigid disk on each frame having a central opening through which the shaft extends, brake lining material on the disks frame, a pair of shafts having oppositely engaged ends threaded with the blocks having the threaded openings, and means for rocking the shafts.

4. A braking mechanism of the class described including, in combination, a pair of spaced parallel members, a pair of plates having openings disposed in spaced parallelism between the members, a shaft rotatable through the openings, a pair of disks on the shaft, means for adjustably engaging the disks with the shaft, a pair of frames, each frame including a pair of blocks, one slidable on each member, a pair of channel irons fixed to the blocks, a second pair of blocks having threaded openings, a rigid disk on each frame having a central opening through which the shaft extends, brake lining material on the disks frame, a pair of shafts having oppositely threaded ends engaged with the blocks having the threaded openings, cranks extending from the last mentioned shafts, and a link connecting the cranks so that they will move in unison.

5. A braking mechanism of the class described including, in combination, a pair of spaced parallel members, a pair of plates having openings disposed in spaced parallelism between the members, a shaft rotatable through the openings, a pair of disks on the shaft, means for adjustably engaging the disks with the shaft, a pair of frames, each frame including a pair of blocks, one slidable on each member, a pair of channel irons fixed to the blocks, a second pair of blocks having threaded openings, a rigid disk on each frame having a central opening through which the shaft extends, brake lining material on the disks frame, a pair of shafts having oppositely threaded ends engaged with the blocks having the threaded openings, cranks extending from the last mentioned shafts, a link connecting the cranks so that they will move in unison, and a plurality of fins on the outer sides of the disks fixed to the shaft first mentioned.

In testimony whereof I affix my signature.

MOULTRIE F. WRENN.